Sept. 10, 1946.   C. MERIAM   2,407,568
MANOMETER
Filed April 21, 1944   2 Sheets-Sheet 2
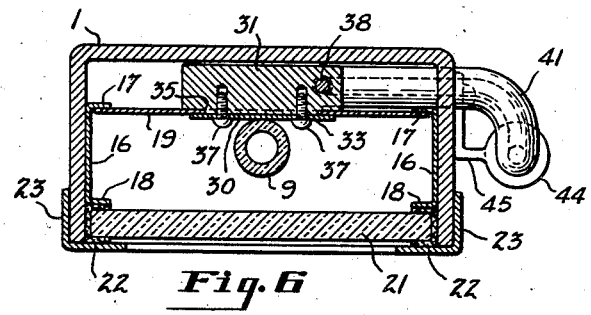
Fig. 6
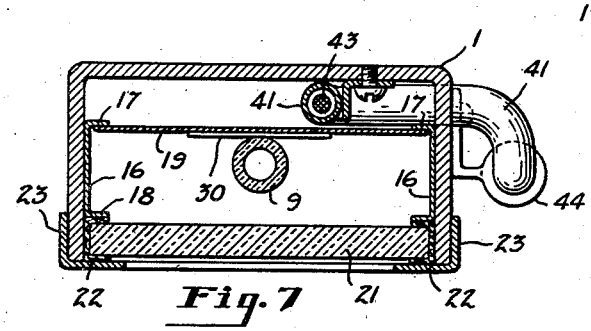
Fig. 7
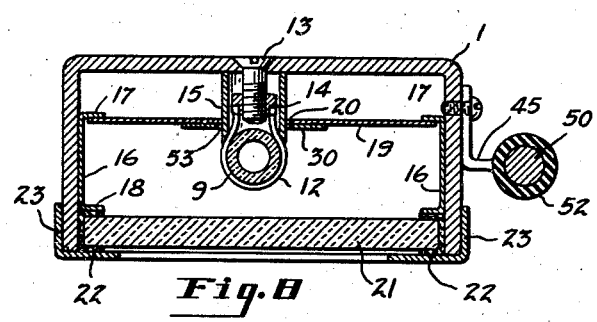
Fig. 8
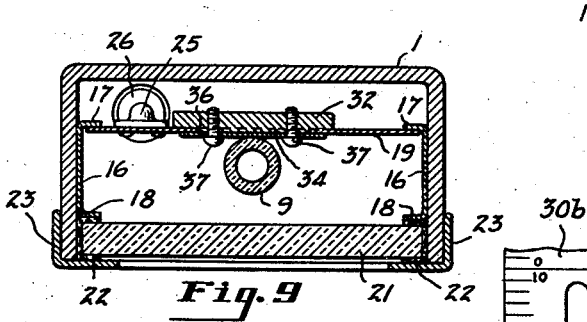
Fig. 9
Fig. 10
Fig. 11
Fig. 12
Fig. 13
INVENTOR
Charles Meriam
BY Evans & McCoy
ATTORNEYS Patented Sept. 10, 1946

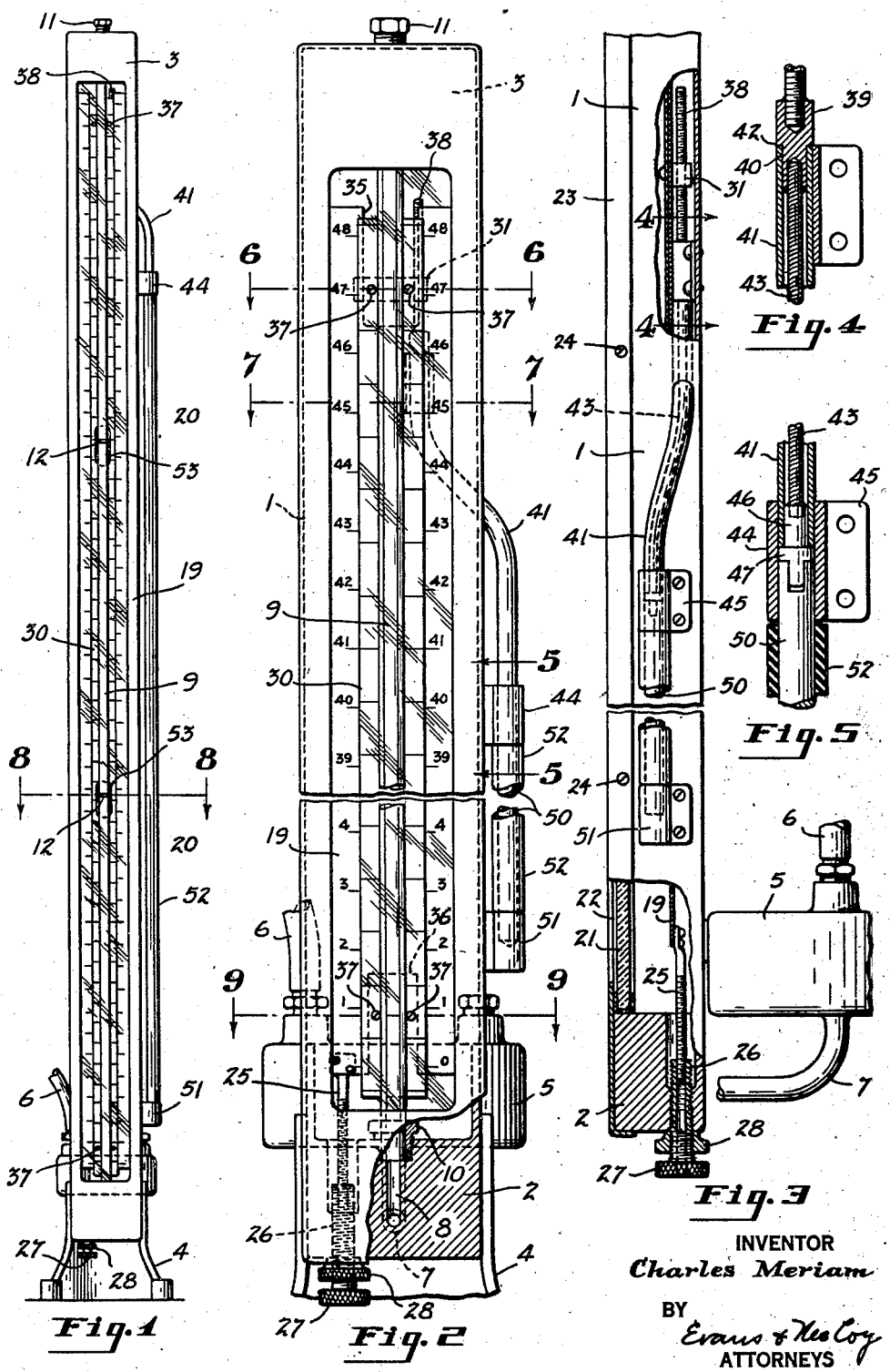

2,407,568

UNITED STATES PATENT OFFICE 2,407,568

MANOMETER

Charles Meriam, Cleveland, Ohio, assignor to The Meriam Instrument Company, Cleveland, Ohio, a corporation of Ohio Application April 21, 1944, Serial No. 532,058

11 Claims. (Cl. 73—401)

This invention relates to manometers and has for its object to provide a main scale and vernier alongside the manometer tube so arranged that readings may be accurately and quickly made at any point along the length of the manometer tube.

With the above and other objects in view the invention may be said to comprise the manometer as illustrated in the accompanying drawings hereinafter described and particularly set forth in the appended claims together with such variations and modifications thereof as will be apparent to one skilled in the art to which the invention pertains.

Reference should be had to the accompanying drawings forming a part of the specification in which:

Fig. 1 is a front elevation of a manometer embodying the invention;

Fig. 2 is a front elevation on an enlarged scale showing the upper and lower end portions of the manometer;

Fig. 3 is a side elevation with portions of the housing broken away to show the scale adjusting screws;

Fig. 4 is a section taken on the line indicated at 4—4 in Fig. 3;

Fig. 5 is a section taken on the line indicated at 5—5 in Fig. 2;

Fig. 6 is a section taken on the line indicated at 6—6 in Fig. 2;

Fig. 7 is a section taken on the line indicated at 7—7 in Fig. 2;

Fig. 8 is a section taken on the line indicated at 8—8 in Fig. 1;

Fig. 9 is a section taken on the line indicated at 9—9 in Fig. 2;

Fig. 10 is an enlarged fragmentary front elevation of a portion of the main scale and vernier;

Fig. 11 is an enlarged fragmentary front elevation showing a modified vernier;

Fig. 12 is a transverse section showing a construction in which the face of the vernier plate is so mounted as to lie in the same plane as the face of the main scale plate; and Fig. 13 is a fragmentary elevation of the vernier shown in Fig. 12.

The manometer of the present invention is mounted in a vertical channel shaped housing member 1 having a solid lower end portion 2 forming a bottom wall and a solid upper end portion 3 forming a top wall. At its lower end the housing 1 is supported upon a base member 4 attached to the lower end of the housing. Upon the back wall of the housing there is mounted a liquid receiving reservoir or well 5 to the top of which is connected a pressure pipe 6 and to the bottom of which is connected a pipe 7 that extends to the lower end portion 2 of the housing and communicates with a vertical bore 8 in said lower end portion. The vertical bore 8 in the lower end portion of the housing communicates with a manometer tube 9 of glass or other transparent material which extends from the bottom wall 2 to the top wall 3 of the housing.

A fluid tight connection at the lower end of the tube 9 is provided by means of a gland 10 and the upper part of the tube extends into an opening in the top wall 3 which is closed by means of a threaded plug 11 which may have an air vent. The tube 9 is supported centrally of the housing and is engaged intermediate its ends by positioning bands 12. Each band 12 embraces the tube 9 and is held in place by means of a screw 13 in the back wall of the housing that has threaded engagement with a nut 14 to which the ends of the band 12 are attached. To properly position the bands 12 with respect to the rear housing wall, a tubular spacer 15 is provided for each band 12 which surrounds the screw 13 and the base portion 14 of the band. Each band 12 is drawn by its screw 13 against the outer end of the spacer 15 and is thus properly positioned in axial alinement with the end supports of the tube 9.

Suitable means is provided for indicating the height of the liquid column in the tube 9. As herein shown, vertical sheet metal channels 16 are mounted on the interiors of the opposite side walls of the housing 1. The channels 16 have inwardly projecting rear flanges 17 spaced from the rear wall of the channel and forward flanges 18 that are spaced inwardly from the outer edges of the channel walls. The inner flanges 17 serve to position a main scale plate 19 that lies behind the tube 9 with its marginal portions bearing against the flanges 17, the plate 19 having slots 20 to receive the spacers 15. The outer flanges 18 of the channels 16 serve to position a transparent panel 21 that forms the front wall of the housing. To form a tight closure and to prevent rattling the panel 21 preferably has strips 22 of felt or similar material glued to its opposite edges and to adjacent marginal portions of the inner and outer faces thereof. The panel 21 is held in place by means of a flanged cover plate 23 apertured to provide a window opening and bearing against the sealing strips 22 with its flanges engaging the exterior of the side wall of the housing and secured thereto by means of screws 24. The scale 19 is adjustable vertically to change the position of its datum point to compensate for barometric variations or other factors involved in the practical use of the instrument.

As herein shown the scale plate 19 is supported upon the upper end of a vertical screw 25 that is threaded at its lower end in a second screw 26 that is bored and tapped to receive the screw 25 and which is screwed into a threaded opening in the bottom wall 2. The screw 26 has a knurled head 27 beneath the base 2 and is provided with a lock nut 28 by means of which it may be locked in adjusted position. Rotation of the screw 26 causes the screw 26 to move up or down and simultaneously causes the screw 25 to move in the same direction at a slower rate.

Mounted upon the main scale plate 19 there is an elongated plate 30 that is provided with a number of vernier scales along the length thereof that lie alongside one or more of the graduated scales of the main scale plate.

As shown in Figs. 1 to 10, the plate 30 is narrower than the plate 19 and is positioned between the central portion of the plate 19 and the tube 9, and is attached to upper and lower guide blocks 31 and 32 that have raised face portions 33 and 34 which are of a height corresponding to the thickness of the plate 19 and of a width to slidingly fit in vertical slots 35 and 36 at the upper and lower ends of the plate 19. The plate 30 is attached to the raised face portions 33 and 34 of the blocks 31 and 32 by screws 37.

The vernier plate 30 is adapted to be adjusted for measurement of the height of the liquid column in the tube 9 at any point throughout the length of the main scale 19. The vernier 30 may be adjusted by means of a screw 38 that engages the upper guide block 31. The lower end of the screw 38 is secured by soldering or other suitable means in a collar 39 that has a reduced lower end 40 rotatable in the upper end of a housing tube 41, the collar 39 having a shoulder 42 engaging the upper end of the tube 41. The upper end of a flexible shaft 43 within the tube 41 is attached to the lower end of the collar 39 by suitable means such as soldering. The tube 41 is bent laterally and extends through a side wall of the housing 1 and has its lower end secured in the upper end of a cylindrical bearing member 44 that is carried by a bracket 45 attached to the side wall of the housing. The lower end of the flexible shaft 43 is attached to a coupling member 46 that is rotatable in the lower end of the tube and has a head portion 47 below the lower end of the tube that rotates within the bearing member 44. At its lower end the coupling member has a projecting tongue that fits in a diametric slot in the upper end of a vertical shaft 50 that has its upper end journaled in the bearing member 44 and its lower end journaled in a bearing member 51 adjacent the lower end of the housing. Between the bearing members 44 and 51 the vertical shaft 50 has a friction covering of rubber or other suitable material 52 which provides a good hand grip anywhere along the length of the shaft so that the shaft can be easily gripped at any point along its length for adjusting the vernier.

As herein shown ten divisions on the vernier scale corresponds to nine divisions on the main scale so that by adusting one of the cross lines of the vernier to the top of the meniscus of the vertical column of liquid, a reading may be taken in tenths of the sub-divisions of the main scale. As shown in Fig. 10 the vernier scale may be graduated throughout its length with each tenth graduation extending across the scale. By alining one of such cross lines with the meniscus as shown in Fig. 10, noting the graduation of the main scale next below the vernier cross line and counting up on the vernier from the cross line to the first graduation that coincides with a graduation of the main scale the correct reading in tenths of the main scale units may be made. The vernier 30 has slots 53 to receive the spacers 15 and these slots are of sufficient length to permit one or another of the cross lines of the vernier to be alined with the meniscus at any point along the length of the main scale.

It will be apparent that the ten graduations above each of the cross lines on the vernier plate 30 form a vernier scale and that, by a short linear adjustment of the plate 30 the nearest cross line on the scale plate 30 may be alined with the meniscus of the liquid column in the tube 9.

It may be desirable in some instances to space the vernier scales apart so as to reduce the likelihood of erroneous readings.

In Fig. 11 of the drawings there is shown a vernier 30a which has separate vernier scales of ten graduations each, that are provided at regularly spaced intervals throughout the length of the vernier plate, the zero graduations only extending to the center of the plate for alinement with the meniscus. In taking the readings the nearest zero line is brought into registry with the meniscus and the correct fraction is determined by counting up from the zero line so positioned. By providing spaced scales on the vernier the operator cannot fall into the error of counting down from a cross line.

It may in some cases be desirable to provide differently graduated scales upon opposite sides of the manometer tube. For example the scale on one side of the tube may be graduated to indicate units of linear measurement such as inches or centimeters and the scale on the opposite side of the tube graduated to indicate units of pressure such as pounds or kilograms. Such graduations are shown in Fig. 11 where the plate 19 has differently graduated scales 60 and 61 and the plate 30a has spaced verniers 62 and 63 for the scales 60 and 61. With one of the zero cross lines of the plate 30a alined with the meniscus as shown in Fig. 11, the verniers 62 and 63 are properly positioned with respect to the scales 60 and 61.

For accurate reading of closely spaced graduations the face of the vernier plate should be in the plane of the face of the main scale plate. Figs. 12 and 13 of the drawings show a modification in which a vernier plate 30b is mounted between two main scale plates 70 and 71 with its front face flush with the front faces of the plates 70 and 71. The plates 70 and 71 are held in parallel relation by one or more backing plates 72 welded to their rear faces. The plate 30b is of a width to fit between the plates 70 and 71 and is slidably supported upon bolts 73 clamped by nuts 74 to the plates 72, the bolts 73 being slidably received in slots 75 in the plate 30b.

It is to be understood that variations and modifications of the specific device herein shown and described for purposes of illustration, may be made without departing from the spirit of the invention.

What I claim is:

1. A manometer comprising a support, a manometer tube mounted on said support, a graduated scale extending alongside said tube, and an elongated endwise slidable plate having a side edge extending along said scale and disposed between said scale and tube, said plate extending substantially the full length of said scale and having a series of vernier scales along said side edge.

2. A manometer comprising a support, a manometer tube mounted on said support, a graduated scale extending along the tube at each side thereof, and an endwise slidable plate having its opposite side edges extending along said scales, said plate extending substantially the full length of said scale and having a series of vernier scales along each of its side edges.

3. A manometer comprising a support, a transparent tube mounted on said support and adapted to receive a liquid indicating column, a graduated scale parallel with said tube, an elongated slidable plate interposed between said scale and tube, said plate having a side edge alongside said scale, said plate having graduations forming a plurality of verniers along said side edge, certain of the vernier graduations extending past the others toward said tube, and means for adjusting said vernier plate longitudinally to aline one of the extending vernier graduations with the top of the indicating column.

4. A manometer comprising a support, a transparent tube mounted on said support and adapted to receive a liquid indicating column, a graduated scale positioned alongside said tube, a slidable plate interposed between said main scale and tube and having a series of vernier scales at the edge thereof alongside the main scale, means for adjusting said main scale, and means for adjusting said vernier plate independently of said main scale.

5. A manometer comprising a support having back and side walls forming a vertically disposed channel, a transparent tube for a liquid indicating column mounted in the support within the channel, positioning members projecting inwardly from said opposite side walls, a main scale plate between said tube and the back wall and having marginal portions engaging said positioning members, said plate having graduations numbered along its opposite edges and a second plate slidably mounted on said main scale plate centrally thereof, and said second plate having graduated vernier scales along opposite edges thereof the graduation at one end of each vernier scale extending from one side edge of said second plate to the other.

6. A manometer comprising a support, a vertical transparent tube mounted on said support and adapted to receive a liquid indicating column, a main scale plate positioned behind said tube, said plate having a central longitudinal slot, a vernier scale plate interposed between the main scale plate and tube, said vernier scale plate being narrower than the main scale plate, said main scale plate having graduations outwardly of a side edge of said vernier plate, said vernier plate having graduations forming spaced vernier scales along said side edge, a guide member fixed to said vernier plate and slidable in said slot, and an adjusting screw engaging said guide member.

7. A manometer comprising a support, a transparent tube for a liquid indicating column mounted on said support, two scales with regularly spaced graduations at opposite sides of said tube, the spacing of the graduations of one scale being different from the spacing of the graduations of the other, a plate interposed between said scales and mounted for adjustment longitudinally thereof, said plate having spaced cross lines adapted to be alined with the top of the liquid column in the tube and graduations at opposite side edges forming a plurality of verniers for each of the two scales, the said cross lines forming the zero graduations of the vernier scales.

8. A manometer comprising a support, a manometer tube mounted on said support, graduated scales extending alongside said tube at opposite sides thereof, and an endwise slidable plate behind said tube and having its opposite side edges alongside said scales, said plate having vernier scales spaced apart along each edge thereof substantially throughout the length of said graduated scale.

9. A manometer comprising a support, a manometer tube mounted on said support, graduated scales extending alongside said tube at opposite sides thereof, and an endwise slidable plate behind said tube and having its opposite side edges alongside said scales, said plate having vernier scales spaced apart along each edge thereof, the zero graduations of the vernier scales at opposite edges of said plate being in alinement and said zero graduations being in the form of cross lines adapted to be alined with the top of the liquid column.

10. A manometer comprising a support, a transparent tube mounted on said support and adapted to receive a liquid indicating column, a main scale plate positioned behind said tube and having a graduated main scale along one side of the tube, a second plate slidably mounted on the first and positioned between said scale plate and tube, said second plate having one edge disposed alongside said graduated scale and having a series of vernier scales along said edge substantially throughout the length of the main scale, the zero graduation of each vernier scale extending behind the tube, and a screw for adjusting said second plate to aline the nearest zero graduation thereon with the top of the liquid column.

11. A manometer comprising a housing having a vertical back wall, a vertically disposed transparent tube in said housing adapted to receive a liquid indicating column, spaced supports for said tube extending forwardly from said back wall, a main scale plate mounted in the housing behind the tube and having slots through which said supports extend, a vernier plate slidably mounted on the main scale plate and having support receiving slots registering with the slots of the main scale plate, and independently operable screws for adjusting said plates vertically.

CHARLES MERIAM.